(12) United States Patent
Lee et al.

(10) Patent No.: US 11,296,556 B2
(45) Date of Patent: Apr. 5, 2022

(54) POWER RELAY DEVICE AND SYSTEM

(71) Applicant: LG ELECTRONICS INC., Seoul (KR)

(72) Inventors: Jihyun Lee, Seoul (KR); Seonghun Lee, Seoul (KR); Bongsik Kwak, Seoul (KR); Joonho Park, Seoul (KR); Sungkyu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 174 days.

(21) Appl. No.: 16/685,874

(22) Filed: Nov. 15, 2019

(65) Prior Publication Data

US 2020/0204003 A1 Jun. 25, 2020

(30) Foreign Application Priority Data

Nov. 15, 2018 (KR) .................. 10-2018-0140517

(51) Int. Cl.
*H02J 7/00* (2006.01)
*H02J 50/40* (2016.01)
(Continued)

(52) U.S. Cl.
CPC .......... *H02J 50/40* (2016.02); *H02J 7/0027* (2013.01); *H02J 7/025* (2013.01); *H02J 50/10* (2016.02)

(58) Field of Classification Search
CPC .. H02J 50/12; H02J 7/025; H02J 50/50; H02J 50/40; H02J 50/80; H02J 7/007; H02J 3/14; H02J 7/00034; H02J 2310/64; H02J 15/00; H02J 3/32; H02J 5/005; H02J 50/70; H02J 13/00028; H02J 13/0086; H02J 2203/20; H02J 2300/24; H02J 2310/10; H02J 3/00; H02J 3/003; H02J 3/008; H02J 3/28; H02J 3/381; H02J 3/40; H02J 7/35; H02J 50/00; H02J 50/90; H02J 7/04; H02J 13/00001; H02J 3/38; H02J 50/10; H02J 7/00304; H02J 7/00308; H02J 13/00004;
(Continued)

(56) References Cited

U.S. PATENT DOCUMENTS

| | | | |
|---|---|---|---|
| 2013/0005252 A1* | 1/2013 | Lee ................. | H02J 50/90 455/41.1 |
| 2014/0021796 A1* | 1/2014 | Song .............. | H02J 5/005 307/104 |

(Continued)

FOREIGN PATENT DOCUMENTS

| | | |
|---|---|---|
| JP | 2013-169100 A | 8/2013 |
| JP | 2014-187848 A | 10/2014 |

(Continued)

*Primary Examiner* — Binh C Tat
(74) *Attorney, Agent, or Firm* — Birch, Stewart, Kolasch & Birch, LLP

(57) ABSTRACT

A power relay device includes a power receiver configured to wirelessly receive power of a first class when coupled with a wireless power transmission device, a first power converter configured to convert power supplied from the power receiver into a form appropriate for a first mobile terminal, a second power converter configured to receive power from the first power converter and to convert the power into power of a second class, and a power transmitter configured to wirelessly transmit the power of the second class to a second mobile terminal.

20 Claims, 7 Drawing Sheets

(51) Int. Cl.
*H02J 7/02* (2016.01)
*H02J 50/10* (2016.01)

(58) Field of Classification Search
CPC .......... H02J 13/00024; H02J 13/00026; H02J 13/0075; H02J 2310/14; H02J 3/383; H02J 50/20; H02J 50/402; H02J 50/60; H02J 7/00045; H02J 13/00022; H02J 2310/48; H02J 2310/60; H02J 3/144; H02J 7/0027; H02J 7/0029; H02J 7/0031; H02J 7/1423; H02J 7/24; H01H 89/00; H01H 50/14; H02M 3/04; H02M 7/04; B60K 6/22
USPC .................................................. 320/106–115
See application file for complete search history.

(56) References Cited

U.S. PATENT DOCUMENTS

2015/0045227 A1* 2/2015 Ahn .................. H02J 50/70
 505/163
2017/0237294 A1 8/2017 Niklaus et al.

FOREIGN PATENT DOCUMENTS

JP 2016-167977 A 9/2016
WO WO 2014/038148 A1 3/2014

\* cited by examiner

POWER RELAY DEVICE AND SYSTEM

CROSS-REFERENCE TO RELATED APPLICATION

This application claims the priority benefit of Korean Patent Application No. 10-2018-0140517, filed on Nov. 15, 2018 in the Korean Intellectual Property Office, the disclosure of which is incorporated herein by reference into the present application.

BACKGROUND OF THE INVENTION

1. Field of the Invention

The present disclosure relates to a power relay device and system.

2. Description of the Related Art

A wireless charger for a mobile terminal is commercially available. A conventional wireless charger is capable of charging a single mobile terminal but use thereof to charge a plurality of mobile terminals has not been considered. In this case, when a single user has a plurality of mobile terminals, it is inconvenient in that the mobile terminals are not simultaneously charged. For example, when a user intends to charge both a laptop computer and a smartphone, he or she experiences inconvenience of charging the laptop computer and the smartphone using separate respective charging devices.

SUMMARY OF THE INVENTION

Therefore, the present disclosure has been made in view of the above problems, and it is an object of the present disclosure to provide a power relay device for charging a plurality of mobile terminals.

It is another object of the present disclosure to provide a system including the power relay device.

The technical problems solved by the embodiments are not limited to the above technical problems and other technical problems which are not described herein will become apparent to those skilled in the art from the following description.

In accordance with the present disclosure, the above and other objects can be accomplished by the provision of a power relay device including a first power converter and a second power converter to supply power of a first class to a first mobile terminal and to supply power of a second class to a second mobile terminal.

Details of other embodiments are included in a detailed description and drawings

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE EMBODIMENTS

Reference will now be made in detail to exemplary embodiments of the present disclosure, examples of which are illustrated in the accompanying drawings. The suffixes "module" and "unit" of elements herein are used for convenience of description and thus can be used interchangeably, and do not have any distinguishable meanings or functions. In the following description of the at least one embodiment, a detailed description of known functions and configurations incorporated herein will be omitted for the purpose of clarity and for brevity. The features of the present disclosure will be more clearly understood from the accompanying drawings and should not be understood to be limited by the accompanying drawings, and it is to be appreciated that all changes, equivalents, and substitutes that do not depart from the spirit and technical scope of the present disclosure are encompassed in the present disclosure.

It will be understood that, although the terms "first", "second", "third" etc. can be used herein to describe various elements, these elements should not be limited by these terms. These terms are only used to distinguish one element from another element.

It will be understood that when an element is referred to as being "on", "connected to" or "coupled to" another element, it can be directly on, connected or coupled to the other element, or intervening elements can be present. In contrast, when an element is referred to as being "directly on," "directly connected to" or "directly coupled to" another element or layer, there are no intervening elements present.

Singular expressions in the present specification include the plural expressions unless clearly specified otherwise in context.

It will be further understood that the terms "comprises" or "comprising" when used in this specification specify the presence of stated features, integers, steps, operations, elements, or components, but do not preclude the presence or addition of one or more other features, integers, steps, operations, elements, components, or groups thereof.

Figure 1:
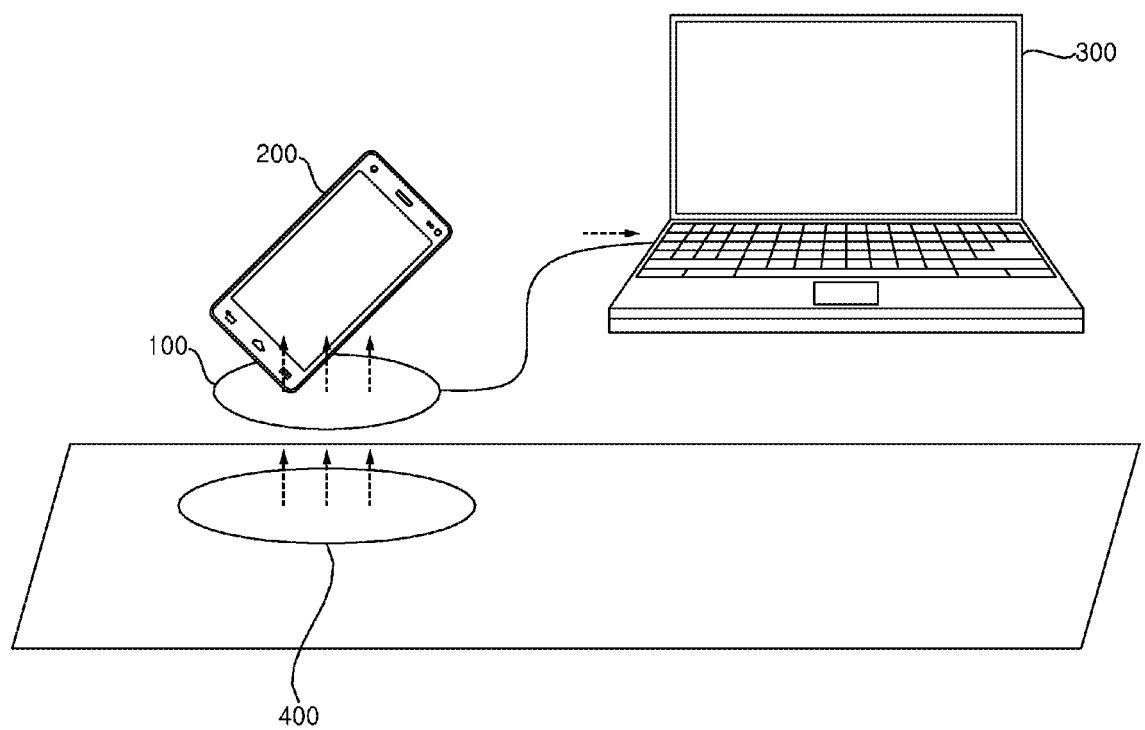
FIG. 1 is a diagram showing a system according to an embodiment of the present disclosure.

FIG. 1 is a diagram showing a system according to an embodiment of the present disclosure.

Figure 2:
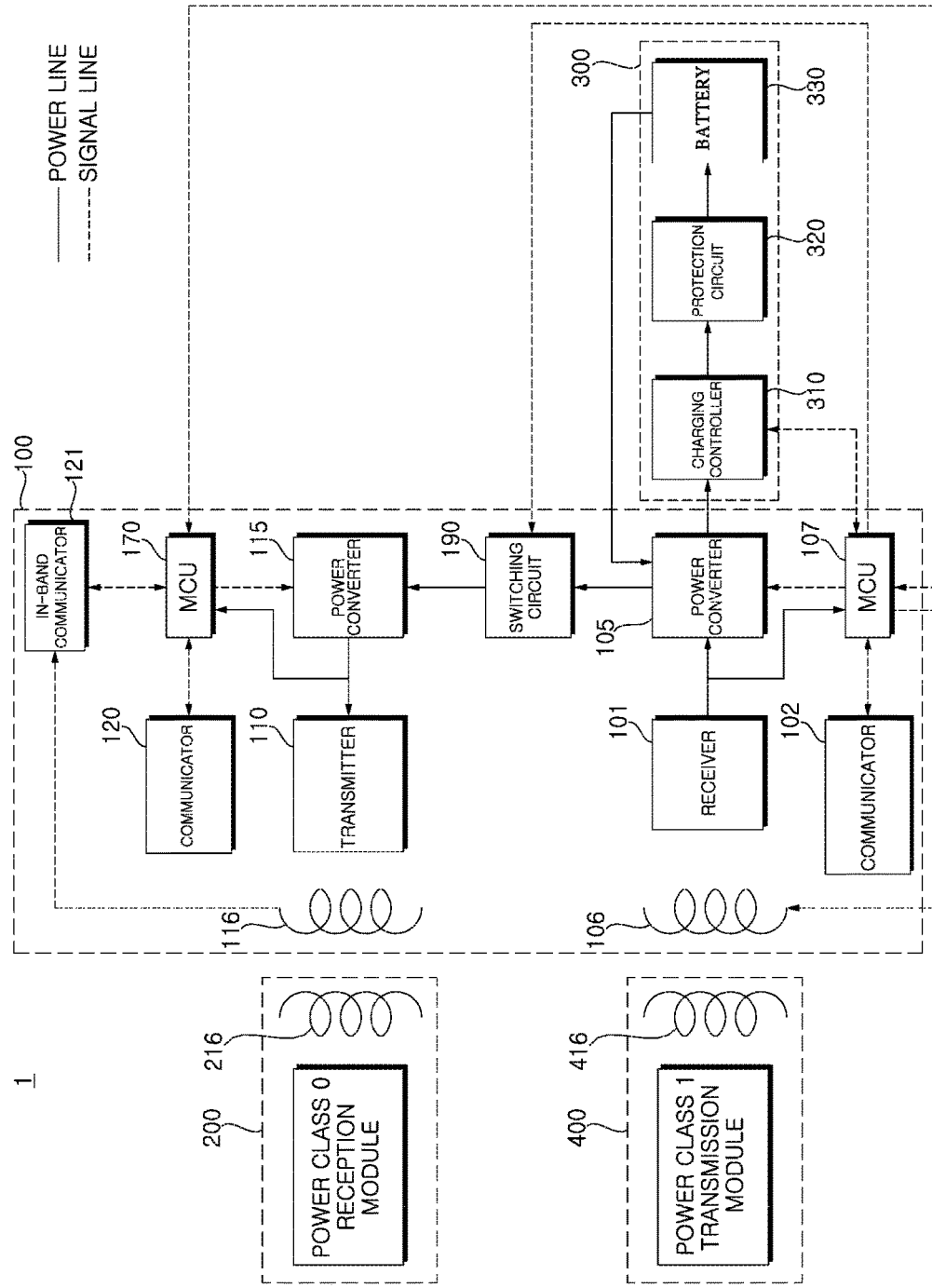
FIG. 2 is a block diagram of a system according to an embodiment of the present disclosure.

FIG. 2 is a block diagram of a system according to an embodiment of the present disclosure.

Figure 3:
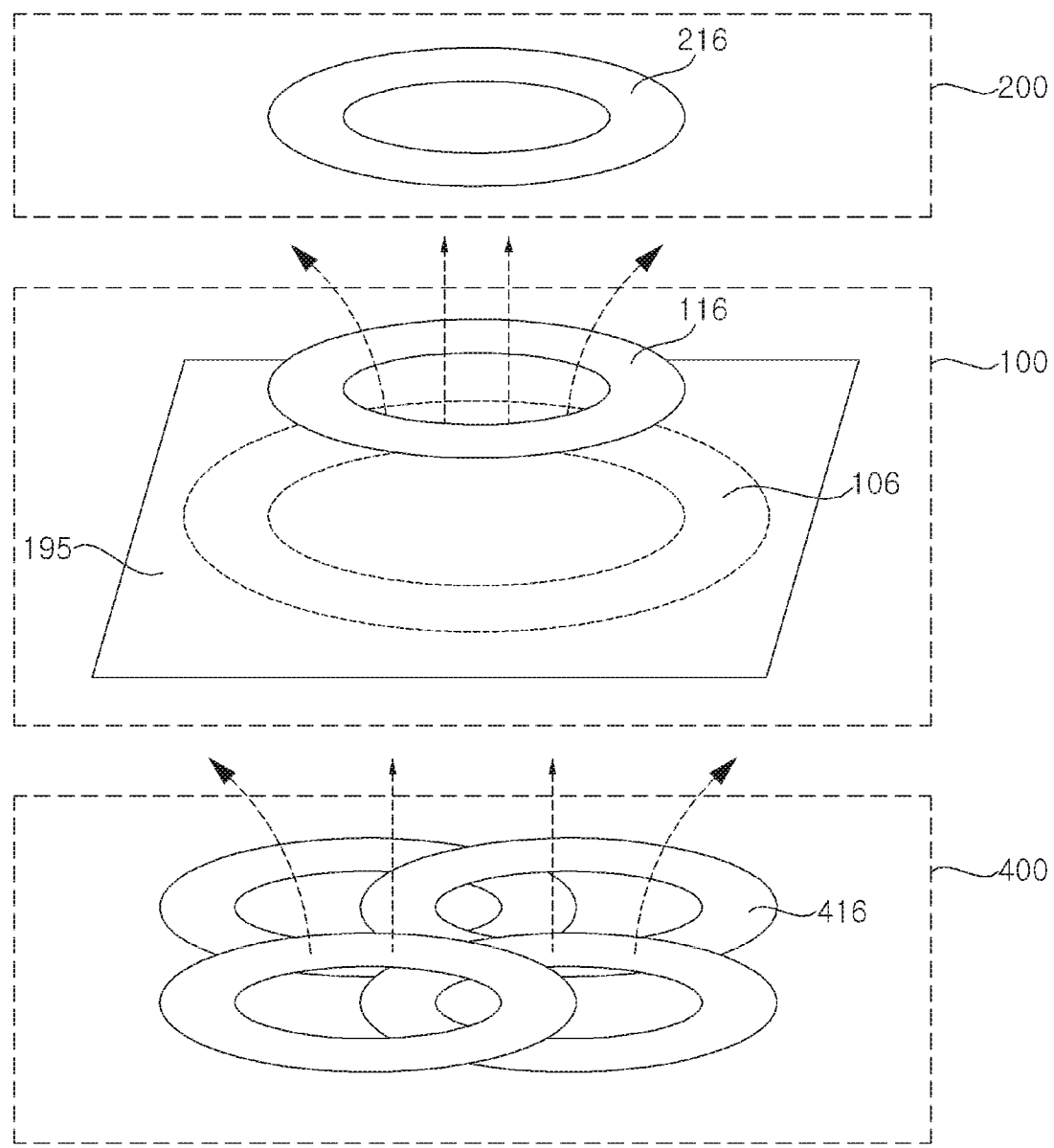
FIGS. 3 and 4 are diagrams showing only some components of a system according to an embodiment of the present disclosure.
Figure 4:
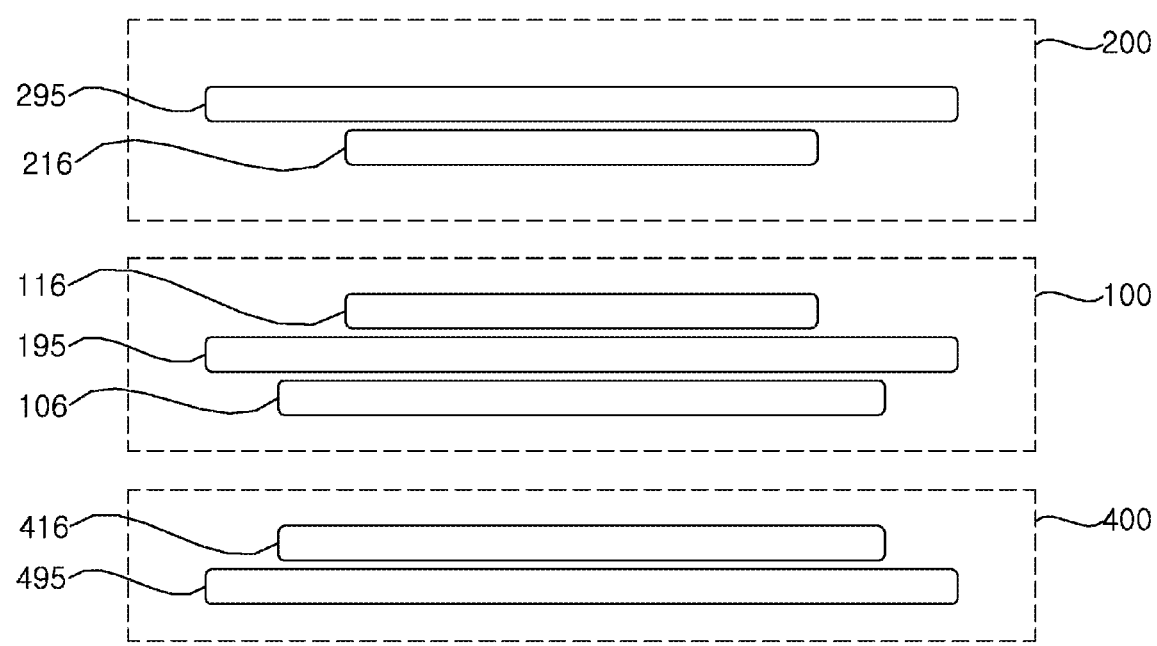

FIGS. 3 and 4 are diagrams showing only some components of a system according to an embodiment of the present disclosure.

Referring to FIGS. 1-4, a system 1 can include at least one wireless power transmission device 400, at least one power relay device 100, at least one first mobile terminal 300, and at least one second mobile terminal 200.

The wireless power transmission device 400 can wirelessly transmit power to the power relay device 100 using an inductive coupling or resonance coupling method.

The inductive coupling method uses a principle whereby, when the intensity of current flowing in a primary coil among two adjacent coils is changed, a magnetic field is changed due to the current whereby the magnetic flux passing through a secondary soil is changed to thus generate induced electromotive force on the side of the secondary coil. That is, according to this method, induced electromotive force can be generated merely by changing the current of the primary coil while the two coils are close to each other without spatially moving two conducting wires.

The resonance coupling method uses a principle whereby some of the variation in a magnetic field generated by applying a resonance frequency to a primary coil, among two coils spaced apart from each other by a predetermined distance, is applied to a secondary coil with the same resonance frequency as that of the primary coil to thus generate induced electromotive force in the secondary soil. That is, according to this method, when transmission and reception devices resonate at the same frequency, electromagnetic waves can be transmitted through a near electromagnetic field, and thus if the transmission and reception devices resonate at different frequencies, no energy is transferred.

The wireless power transmission device 400 can include a power transmitter, a communicator, and a processor. In some embodiments, the wireless power transmission device 400 can further include components other than the described components.

The power transmitter can wirelessly transmit power to the power relay device 100. The power transmitter can convert power to a wireless power signal and can transfer the wireless power signal to the power relay device 100. The wireless power signal transferred by the power transmitter can take the form of a magnetic field or an electro-magnetic field that oscillates.

The power transmitter can transfer power to the power relay device 100 using one or both of the inductive coupling and the resonance coupling methods. The power transmitter can include a converter for appropriately converting received power into power to be transmitted, an inverter for converting output power of the converter into alternating current (AC) power, a power sensor for monitoring the current flowing into, or the voltage applied to, the transmission coil, and a transmission coil for wirelessly transmitting power to the power relay device 100 based on the AC power converted by the inverter. In some embodiments, some components can be omitted from the power transmitter, or the power transmitter can further include other components.

The communicator can exchange a signal with the power relay device 100 positioned within a preset distance. The communicator can exchange a signal with the power relay device 100 using an in-band communication method or an out-of-band communication method. The in-band communication method can be a communication method of exchanging a signal with the power relay device 100 using a transmission coil as an antenna. The out-of-band communication method can be a communication method of exchanging a signal with the power relay device 100 through a communication circuit and an antenna, which are installed separately from the power transmitter.

The processor can control the overall operation of each unit of the wireless power transmission device 400.

The power relay device 100 can include a power receiver 101, a first power converter 105, a second power converter 115, and a power transmitter 110. In some embodiments, the power relay device 100 can further include a first communicator 102, a first processor 107 (e.g., microcontroller unit MCU), a switch 190, a second communicator 120, a second processor 170 (e.g., microcontroller unit MCU), and an in-band communicator 121 in a separate or combined form.

The power receiver 101 can be coupled with the wireless power transmission device 400. For example, the power receiver 101 can be inductively coupled with the wireless power transmission device 400. For example, the power receiver 101 can be resonantly coupled with the wireless power transmission device 400. The power receiver 101 can be coupled with the wireless power transmission device 400 when the power relay device 100 is positioned within a predetermined distance from the wireless power transmission device 400.

When the power receiver 101 is coupled with the wireless power transmission device 400, the power receiver 101 can receive power of a first class. The power of the first class can be defined as power for charging the battery of the first mobile terminal 300. For example, the power of the first class can fall within a range 0 to 60 W.

The power receiver 101 can include a reception coil 106. The power receiver 101 can be coupled with the wireless power transmission device 400 using the reception coil 106 as a medium. The reception coil 106 can be implemented using any one of copper, Litz wire, and PCB. The reception coil 106 can be configured as a single coil or multiple coils.

The power receiver 101 can further include an impedance matching circuit, a rectifier, and a regulator in a separate or combined form.

The power receiver 101 can supply power to the first processor 107. The power receiver 101 can supply power to the first communicator 102.

The first power converter 105 can convert the power provided from the power receiver 101 into a form appropriate for the first mobile terminal 300. The first power converter 105 can convert DC power provided from the power receiver 101 into DC power appropriate for the first mobile terminal 300. The first power converter 105 can convert DC power provided from the power receiver 101 into AC power appropriate for the first mobile terminal 300. To this end, the first power converter 105 can include at least one power conversion device.

The first power converter 105 can supply the power of the first class to the first mobile terminal 300 in a wired manner. When the first mobile terminal 300 needs to be charged, a user can connect a cable of the power relay device 100 to the first mobile terminal 300. In this case, the first power converter 105 can supply power to the first mobile terminal 300 through the cable.

When the power receiver 101 is not coupled with the wireless power transmission device 400, the first power converter 105 can receive power from the first mobile terminal 300 in a wired manner. When power from the power receiver 101 is not supplied to the first power converter 105, the first power converter 105 can receive power from a battery 330 of the first mobile terminal 300. The first power converter 105 can provide the power supplied from the battery 330 to the second power converter 115.

In the state in which the first power converter 105 receives power from the battery 330 of the first mobile terminal 300 in a wired manner, when the power receiver 101 is coupled with the wireless power transmission device 400, the first power converter 105 can block the power received from the battery 330 of the first mobile terminal 300 and can receive power from the power receiver 101.

The first power converter 105 can supply power to the second power converter 115. In some embodiments, the first power converter 105 may or may not supply power to the second power converter 115 according to a switching operation of the switch 190.

The first power converter 105 can supply power to the first processor 107. The first power converter 105 can supply power to the first communicator 102.

The second power converter 115 can receive power from the first power converter 105 and can convert the power to power of a second class. The power of the second class can be defined as power for charging a battery of the second mobile terminal 200. For example, the power of the second class can fall within a range from 5 to 15 W. The second power converter 115 can include at least one power conversion device.

The second power converter 115 can supply power to the second processor 170. The second power converter 115 can supply power to the second communicator 120. The second power converter 115 can supply power to the in-band communicator 121.

The power transmitter 110 can be coupled with the second mobile terminal 200. For example, power transmitter 110 can be inductively coupled with the second mobile terminal 200. For example, the power transmitter 110 can be resonantly coupled with the second mobile terminal 200. When the power relay device 100 is positioned within a predetermined distance from the second mobile terminal 200, the power transmitter 110 can be coupled with the second mobile terminal 200.

The power transmitter 110 can receive the power of the second class from the second power converter 115. The power transmitter 110 can wirelessly transmit the power of the second class to the second mobile terminal 200.

The power transmitter 110 can include a transmission coil 116. The power transmitter 110 can be coupled with the second mobile terminal 200 using the transmission coil 116 as a medium. The transmission coil 116 can wirelessly transmit power, and can perform in-band communication with the second mobile terminal 200. The in-band communication method can be a communication method of exchanging a signal with the mobile terminal 200 using the transmission coil 116 as an antenna. The transmission coil 116 can be implemented using any one of copper, Litz wire, and PCB. The transmission coil 116 can be configured as a single coil or multiple coils.

The power transmitter 110 can further include an impedance matching circuit, an inverter, and a converter in a separate or combined form.

The switch 190 can disconnect the first power converter 105 and the second power converter 115. The switch 190 can be operated according to a control signal provided by the first processor 107. The switch 190 can be repeatedly turned on and off at a predetermined rate under the control of the first processor 107. The switch 190 can be turned on when the second mobile terminal 200 is detected, and can be turned off when the second mobile terminal 200 is not detected.

When the power transmitter 110 is coupled with the second mobile terminal 200, the switch 190 can connect the first power converter 105 to the second power converter 115. When the power transmitter 110 is not coupled with the second mobile terminal 200, the switch 190 can interrupt the connection between the first power converter 105 and the second power converter 115.

Power is supplied to the power transmitter 110 only when the switch 190 is turned on, and thus digital ping for detection of the second mobile terminal 200 (Rx detection) can be possible.

As such, when necessary, power is supplied to the second power converter 115 through switching of the switch 190, and thus energy waste can be reduced and the external influence of magnetic fields, that is, EMI, can be reduced.

The first communicator 102 can exchange a signal with the wireless power transmission device 400 positioned within a preset distance. The first communicator 102 can communicate with the wireless power transmission device 400 using an out-of-band communication method. The out-of-band communication method can be a communication method of exchanging a signal with the wireless power transmission device 400 through an antenna and a communication circuit, which are separately installed from the power receiver 101 for wirelessly receiving power. The first communicator 102 can use any one of communication methods such as Bluetooth, NFC, ZigBee, and RF.

The first processor 107 can exchange a signal with at least one of the power receiver 101, the communicator 102, the first power converter 105, the switch 190, or the second processor 170. The first processor 107 can provide a control signal, and thus can control the power receiver 101, the communicator 102, the first power converter 105, the switch 190, and the second processor 170.

The first processor 107 can receive a DC voltage value, provided by the power receiver 101, from the power converter 105. The first processor 107 can control the power converter 105 based on the received voltage value.

The second communicator 120 can exchange a signal with the second mobile terminal 200 positioned within a preset distance. The second communicator 120 can communicate with the second mobile terminal 200 using an out-of-band communication method. The second communicator 120 can use any one of communication methods among Bluetooth, NFC, ZigBee, and RF.

The second processor 170 can exchange an electric signal with at least one of the power transmitter 110, the communicator 120, the second power converter 115, the in-band communicator 121, or the first processor 107. The second processor 170 can provide a control signal, and thus can control at least one of the power transmitter 110, the communicator 120, the second power converter 115, the in-band communicator 121, or the first processor 107.

The in-band communicator 121 can process a signal received through the transmission coil 116. To this end, the in-band communicator 121 can include a demodulation circuit for in-band communication.

In the state in which the power receiver 101 is coupled with the wireless power transmission device 400, the power receiver 101 can transmit power with the first mobile terminal 300 and the second mobile terminal 200 according to the operation of the first power converter 105, the second power converter 115, and the power transmitter 110.

The first mobile terminal 300 can include a charging controller 310, a protection circuit 320, and the battery 330. The charging controller 310 can control at least one of charging voltage or current required for the battery 330 to achieve stable charging. The protection circuit 320 can prevent unbalanced battery charging such as overvoltage or overcurrent of the battery 330.

The battery 330 can supply power required to drive the first mobile terminal 300. When the power receiver 101 is not coupled with the wireless power transmission device 400, the battery 330 can supply power to the first power converter 105 in a wired manner.

The first mobile terminal 300 can be a laptop computer type terminal.

The second mobile terminal 200 can include a power receiver, a communicator, a charger, a battery, and a controller. The power receiver can receive power that is wirelessly transmitted from the power relay device 100. The power receiver can include a reception coil, a rectifier, and a regulator. The communicator can transmit data to the power relay device 100. For example, the communicator can transmit packet data to the power relay device 100. The charger can charge a battery using power supplied through the power receiver. The controller can control the overall operation of each unit of the second mobile terminal 200.

The second mobile terminal 200 can be a smart phone type terminal.

Referring to FIGS. 3 and 4, the power relay device 100 can further include a shield 195. The shield 195 can be disposed between the power receiver 101 and the power transmitter 110. The shield 195 can be disposed between the reception coil 106 of the power receiver 101 and the transmission coil 116 of the power transmitter 110. The shield 195 can be disposed between the reception coil 106 and the transmission coil 116 to block mutual interference due to a magnetic field. The shield 195 can be formed to have a predetermined thickness or greater. The shield 195 can be formed of at least one of nanocrystals, amorphous, MnZn, or NiZn.

The wireless power transmission device 400 can include a shield 495. The shield 495 can be positioned below a transmission coil 416 of the wireless power transmission device 400. The shield 495 can be formed of at least one of nanocrystal, amorphous, MnZn, or NiZn. The second mobile terminal 200 can include a shield 295. The shield 295 can be positioned above a reception coil 216 of the second mobile terminal 200. The shield 295 can be formed of at least one of nanocrystal, amorphous, MnZn, or NiZn.

Figure 5:
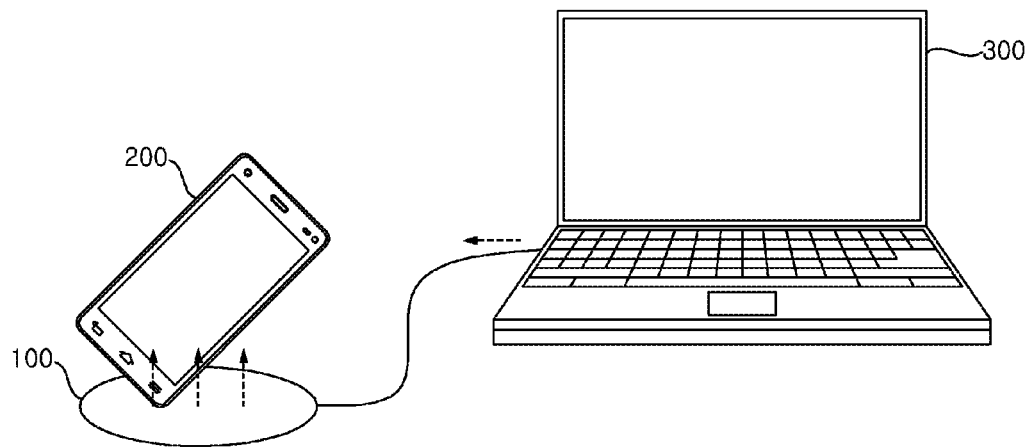
FIG. 5 is a diagram for explaining a power relay device depending on whether a power relay device and a wireless power transmission device are coupled with each other according to an embodiment of the present disclosure.

FIG. 5 is a diagram for explaining a power relay device depending on whether a power relay device and a wireless power transmission device are coupled with each other according to an embodiment of the present disclosure.

Referring to FIG. 5, when the power relay device 100 and the wireless power transmission device are not coupled with each other, the power relay device 100 can receive power from the first mobile terminal 300 in a wired manner. The power relay device 100 can wirelessly supply the power supplied from the first mobile terminal 300 to the second mobile terminal 200.

The first mobile terminal 300 can be connected to a cable of the power relay device 100. A battery (e.g., battery 330) of the first mobile terminal 300 can supply power to the power relay device 100. The first power converter 105 can receive power from the battery of the first mobile terminal 300. The first power converter 105 can supply power supplied from the battery of the first mobile terminal 300 to the second power converter 115. The second power converter 115 can convert the power supplied from the first power converter 105 into the power of the second class. The power transmitter 110 can receive the power of the second class from the second power converter 115 and can wirelessly supply the power to the second mobile terminal 200.

Figure 6:
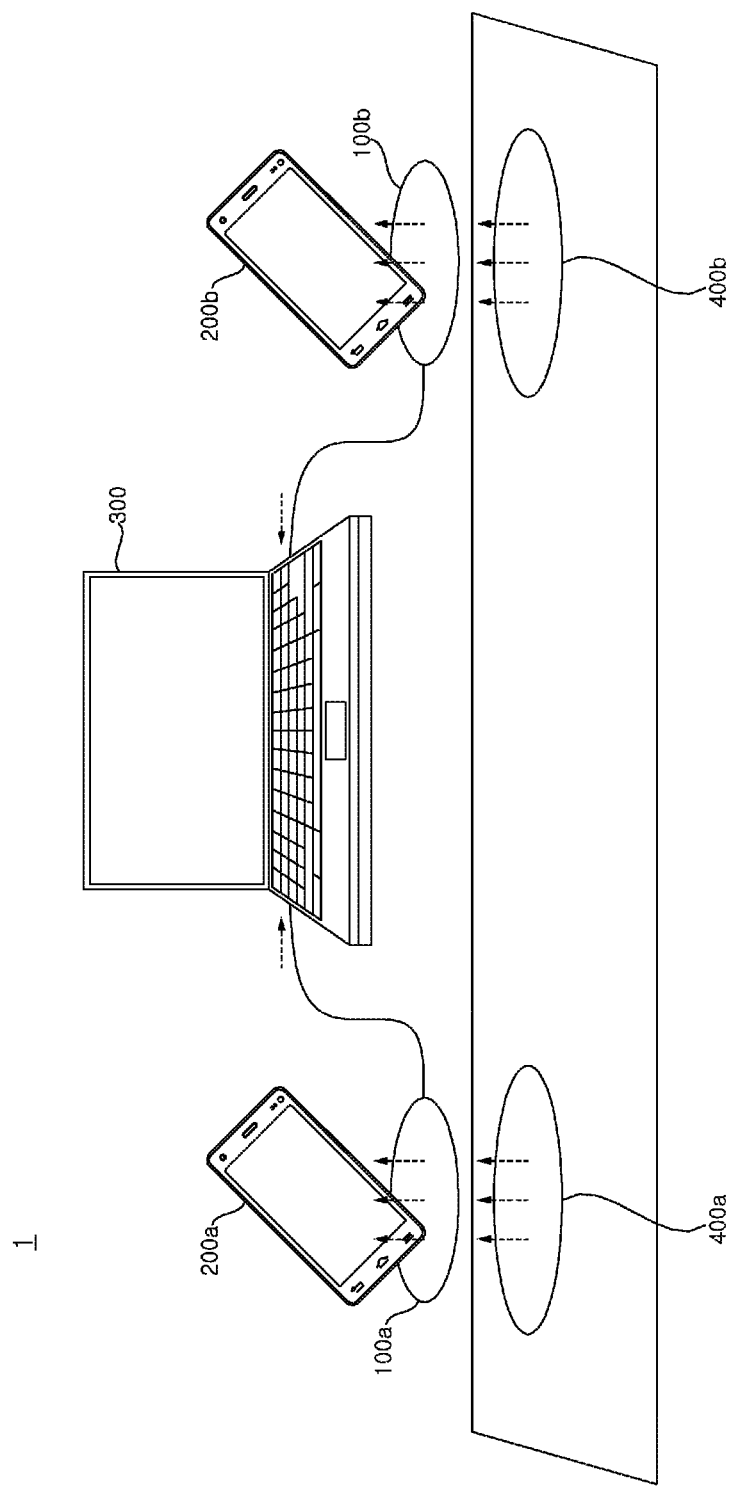
FIG. 6 is a diagram showing a system including a plurality of power relay devices according to an embodiment of the present disclosure.

FIG. 6 is a diagram showing a system including a plurality of power relay devices according to an embodiment of the present disclosure.

Referring to FIG. 6, the system 1 can include a first wireless power transmission device 400a, a second wireless power transmission device 400b, a first power relay device 100a, a second power relay device 100b, the first mobile terminal 300, a $2a^{th}$ mobile terminal 200a, and a $2b^{th}$ mobile terminal 200b.

The description of the wireless power transmission device 400 described with reference to FIGS. 1 to 5 can be applied to the first wireless power transmission device 400a and the second wireless power transmission device 400b. The description of the power relay device 100 described with reference to FIGS. 1 to 5 can be applied to the first power relay device 100a and the second power relay device 100b. The description of the first mobile terminal 300 described with reference to FIGS. 1 to 5 can be applied to the first mobile terminal 300. The description of the second mobile terminal 200 described with reference to FIGS. 1 to 5 can be applied to the $2a^{th}$ mobile terminal 200a and the $2b^{th}$ mobile terminal 200b.

The first and second power relay devices 100a and 100b can wirelessly receive power from the first and second wireless power transmission devices 400a and 400b, respectively, and can transmit power to the first mobile terminal 300 in a wired manner. In this case, the first mobile terminal 300 can charge a battery more rapidly than in the case in which a single power relay device is used. The number of the power relay devices 100a and 100b can be increased to supply as much power as possible to the first mobile terminal 300 so that the size of a coil and shield of the power relay devices 100a and 100b can be reduced. The number of power relay devices 100a and 100b can be increased, and thus the number of second mobile terminals to be charged can be increased.

Figure 7:
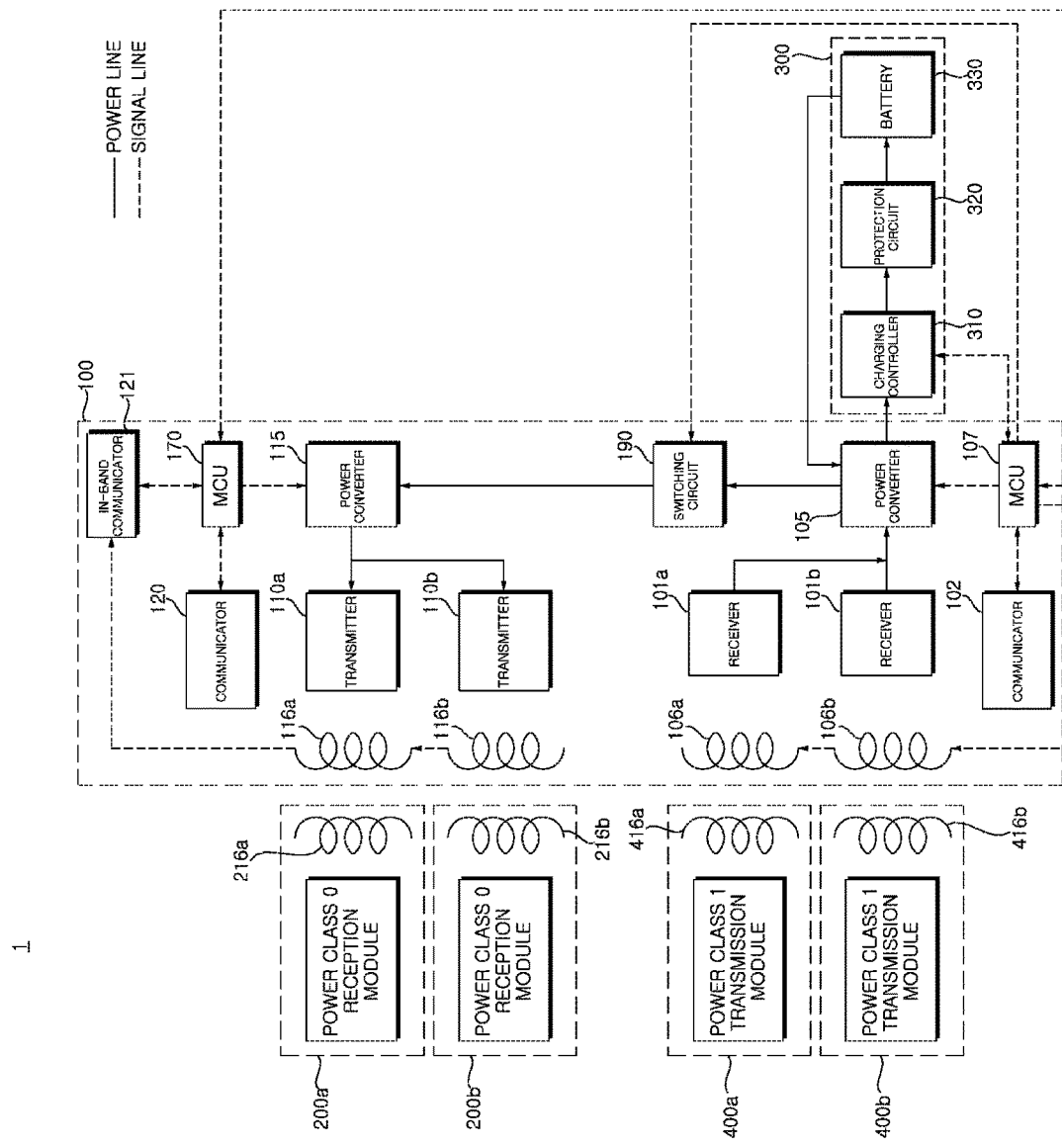
FIG. 7 is a block diagram of a system including a plurality of power relay devices according to an embodiment of the present disclosure.

FIG. 7 is a block diagram of a system including a plurality of power relay devices according to an embodiment of the present disclosure. FIG. 7 shows an example of an equivalent circuit of the system 1 of FIG. 6.

Referring to FIG. 7, a power relay device 100 can include a first power receiver 101a, a second power receiver 101b, the first power converter 105, the second power converter 115, a first power transmitter 110a, a second power transmitter 110b, the first communicator 102, the first processor 107, the switch 190, the second communicator 120, the second processor 170, and the in-band communicator 121.

The first power receiver 101a can receive power from the first wireless power transmission device 400a. The second power receiver 101b can receive power from the second wireless power transmission device 400b. The description of the power receiver 101 made with reference to FIGS. 1 to 5 can be applied to the first power receiver 101a and the second power receiver 101b.

The first power transmitter 110a can transmit power to the $2a^{th}$ mobile terminal 200a. The second power transmitter 110b can transmit power to the $2b^{th}$ mobile terminal 200b. The description of the power transmitter 110 made with reference to FIGS. 1 to 5 can be applied to the first power transmitter 110a and the second power transmitter 110b.

The description of the first power converter 105, the second power converter 115, the first communicator 102, the first processor 107, the switch 190, the second communicator 120, the second processor 170, and the in-band communicator 121 made with reference to FIGS. 1 to 5 can be applied to the first power converter 105, the second power converter 115, the first communicator 102, the first processor 107, the switch 190, the second communicator 120, the second processor 170, and the in-band communicator 121, respectively.

The present disclosure can have one or more effects.

First, a wireless charging reception module for a notebook computer can also be operated in a dual mode for functioning as a transmitter for a smartphone without a separate battery, and thus the notebook computer and the smartphone can be simultaneously charged.

Second, any externally installed wireless charging module can be applied, irrespective of the size of a notebook computer.

Third, when two externally installed wireless charging modules are used, charging can be rapidly performed at double the speed compared with the conventional case, and when the two modules are used, the two modules, serving as a mobile wireless charger can simultaneously charge two terminals.

The technical problems solved by the embodiments are not limited to the above technical problems and other technical problems which are not described herein will become apparent to those skilled in the art from the following description.

The aforementioned present disclosure can also be embodied as computer-readable code stored on a computer-readable recording medium. The computer-readable recording medium is any data storage device that can store data which can thereafter be read by a computer or the like. Examples of the computer-readable recording medium include a hard disk drive (HDD), a solid state drive (SSD), a silicon disk drive (SDD), read-only memory (ROM), random-access memory (RAM), CD-ROM, magnetic tapes, floppy disks, optical data storage devices, carrier waves (e.g., transmission via the Internet, short-range communications, etc.), etc. In addition, the computer can also include a processor or a controller. Thus, it will be apparent to those skilled in the art that various modifications and variations can be made in the present disclosure without departing from the spirit or scope of the embodiments. Thus, it is intended that the present disclosure cover such modifications and variations to the embodiments provided they come within the scope of the appended claims and their equivalents.

What is claimed is:

1. A power relay device comprising:
   a power receiver configured to wirelessly receive power of a first class when coupled with a wireless power transmission device;
   a first power converter configured to convert power supplied from the power receiver into a form appropriate for a first mobile terminal, and transmit the converted power to the first mobile terminal;
   a second power converter configured to receive power from the first power converter, and convert the power received from the first power converter into power of a second class;
   a power transmitter configured to wirelessly transmit the power of the second class to a second mobile terminal; and
   a switch connected between the first power converter and the second power converter, and configured to supply or not supply power from the first power converter to the second power converter according to a switching operation,
   wherein the switch is configured to electrically connect the first power converter to the second power converter when the power transmitter is coupled with the second mobile terminal, and electrically disconnect the first power converter from the second power converter when the power transmitter is not coupled with the second mobile terminal.

2. The power relay device of claim 1, wherein the first power converter transmits the converted power of the first class to the first mobile terminal in a wired manner.

3. The power relay device of claim 2, wherein when the power receiver is not coupled with the wireless power transmission device, the first power converter is configured to receive power from a battery of the first mobile terminal in a wired manner.

4. The power relay device of claim 3, wherein while the first power converter receives power from the battery of the first mobile terminal in the wired manner, if the power receiver is switched to be coupled with the wireless power transmission device, the first power converter is configured to interrupt the power received from the battery of the first mobile terminal and receive power from the power receiver via the wireless power transmission device.

5. The power relay device of claim 3, wherein the first power converter is configured to provide power received from the battery of the first mobile terminal to the second power converter.

6. The power relay device of claim 1, further comprising:
   a first communicator configured to perform out-of-band communication with the wireless power transmission device.

7. The power relay device of claim 6, further comprising:
   a second communicator configured to perform out-of-band communication with the second mobile terminal positioned within a preset distance.

8. The power relay device of claim 1, wherein the power transmitter includes a power transmission coil configured to wirelessly transmit power and perform in-band communication with the second mobile terminal.

9. The power relay device of claim 1, further comprising:
   a shield disposed between a reception coil of the power receiver and a transmission coil of the power transmitter.

10. The power relay device of claim 1, further comprising:
    another power receiver configured to wirelessly receive power when coupled with another wireless power transmission device,
    wherein the first power converter is configured to convert power from the another power receiver, and the second power converter is configured to receive power from the first power converter and convert the power received from the first power converter for a third mobile terminal; and
    another power transmitter configured to wirelessly transmit the converted power from the second power converter to the third mobile terminal.

11. The power relay device of claim 1, wherein the switch is further configured to be repeatedly turned on and off at a predetermined rate under a control of a first processor.

12. A power relay device comprising:
    a first power converter configured to receive power using a wireless power transfer operation, and convert the received power into power of a first class for charging one or more first mobile terminals;
    a second power converter configured to receive power from the first power converter, and convert the power received from the first power converter into power of a second class for charging one or more second mobile terminals; and
    a switch configured to selectively connect the first power converter to the second power converter based on whether one of the one or more second mobile terminals is positioned near the power relay device to be wirelessly charged,
    wherein the switch is connected between the first power converter and the second power converter, and is configured to supply or not supply power from the first power converter to the second power converter according to a switching operation, and wherein the switch is configured to electrically connect the first power converter to the second power converter when the power transmitter is coupled with the second mobile terminal, and electrically disconnect the first power converter from the second power converter when the power transmitter is not coupled with the second mobile terminal.

13. The power relay device of claim 12, further comprising:
   at least one power transmitter configured to wirelessly transmit the power of the second class to the one or more second mobile terminals.

14. The power relay device of claim 13, wherein the at least one power transmitter includes a plurality of power transmitters configured to wirelessly transmit the power of the second class to the second mobile terminals, respectively.

15. The power relay device of claim 12, further comprising:
   at least one power receiver configured to wirelessly receive power from at least one wireless power transmission device using the wireless power transfer operation, and supply the received power to the first power converter.

16. The power relay device of claim 15, wherein the at least one wireless power transmission device includes a plurality of wireless power transmission devices, and wherein the at least one power receiver includes a plurality of power receivers configured to wirelessly receive the power from the plurality of wireless power transmission devices, respectively.

17. The power relay device of claim 15, further comprising:
   a communicator configured to perform out-of-band communication with the at least one wireless power transmission device.

18. The power relay device of claim 13, further comprising:
   at least one power receiver configured to wirelessly receive power from at least one wireless power transmission device using the wireless power transfer operation, and supply the received power to the first power converter.

19. The power relay device of claim 18, wherein the at least one power transmitter includes a power transmission coil configured to wirelessly transmit power and perform in-band communication with the second mobile terminal.

20. The power relay device of claim 18, further comprising:
   a shield disposed between a reception coil of the at least one power receiver and a transmission coil of the at least one power transmitter.

* * * * *